INVENTOR.
John Malenick &
BY Raymond P. Riche

Paul J. Ethington
ATTORNEY

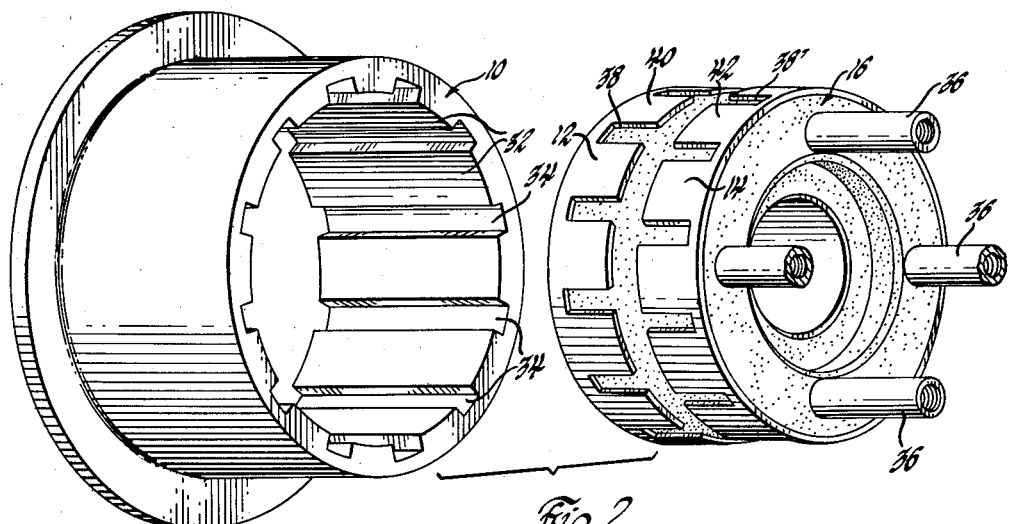

United States Patent Office 3,121,839
Patented Feb. 18, 1964

3,121,839
CAPACITIVE PICKOFF FOR DISPLACEMENT SIGNAL GENERATOR
John Malenick, Brookfield, and Raymond P. Riche, Hales Corners, Wis., assignors to General Motors Corporation, Detroit, Mich., a corporation of Delaware
Filed Aug. 21, 1961, Ser. No. 132,782
5 Claims. (Cl. 323—75)

This invention relates to displacement signal generators and more particularly to a capacitive pickoff which can be used to determine the angular displacement of a rotatable member relative to a fixed member.

Capacitive pickoffs have been devised for use in determining the position of one member relative to another and may be used advantageously in many applications such as gyroscopic devices in navigational equipment.

In one form, a capacitive pickoff includes two or more stationary capacitive pickoff plates which cooperate with a number of salient surfaces on a rotatable member to produce a varying capacitance when the rotatable member is angularly displaced. When connected to a source of excitation voltage, the output current magnitude will vary with the capacitance and hence with the relative angular position of the member. In another known form the pickoff plates are energized by a D.C. source and continual rotation of the member comprising the common capacitive element generates a fluctuating current from each of the associated capacitive plates. The amplitude of the fluctuating current from each plate depends on the distance between it and the common element. The plates may be located such that the signals generated are 180° out of phase. The signals are then combined and the difference indicates the relative angular position of the members.

Several disadvantages exist in such known devices. Among these is sensitivity to stray capacitance from outside sources. This is due to the fact that the capacitance between the pickoff plates and the common member is quite small. Further, such devices are sensitive to both radial and axial displacement of the rotatable member and can be erroneously shifted from a predetermined electrical null position because of such displacements.

It is an object of the present invention to provide novel structural means which eliminate the previously inherent disadvantages of capacitive pickoffs. This is accomplished through the use of a cylindrical common capacitive element having a plurality of salient capacitive surfaces which cooperate with two annular bands each comprising a plurality of capacitive elements which are mounted on a member coaxial with the common capacitive element to comprise the pickoff plates. Since the common capacitive element and the pickoff plates are coaxially mounted cylinders, a small radial displacement of one member relative to the other results in a net capacitance change of zero and thus an output signal null is unaffected. A further advantage of the present invention is its insensitivity to small axial displacements of one member relative to the other. This is due to the fact that the length of the cylindrical member comprising the common capacitive element is greater than the overall length of the associated pickoff plates. Thus, the pickoff plates may be axially displaced relative to the common member over a small range and still remain entirely within the axial extremities of the common capacitive element. Capacitive stability is further improved through the use of a ceramic material for the member on which the pickoff plates are mounted. The ceramic material affords very close dimensional tolerances which remain stable through a wide temperature range. A further advantage of the present invention is its relative insensitivity to externally caused capacitance. This is accomplished first by using an outer capacitive element which is made entirely of conductive material and secondly by isolating the capacitive pickoff plates from the error signal output terminal by a center tapped transformer. With the present invention, the capacitive pickoff plates can be mounted such that rotation of the common capacitive element results in an increase in capacitance between one pickoff plate and the common element and a decrease in capacitance between the other pickoff plate and the common element. When incorporated with the electrical circuitry which forms part of the present invention, this double capacitance change provides a push-pull action which results in greater output signal sensitivity to small values of angular displacement between the relatively moving members.

These and other advantages of the present invention will become more apparent upon reading of the following specification taken with the drawings of which:

FIGURE 2 is illustrative of one form of the inventive capacitive pickoff in a disassembled view showing the rotor and stator elements;

FIGURE 3 is a schematic diagram of the associated electrical circuitry; and

FIGURE 4 shows the linear characteristic of the signal which may be generated by the inventive capacitive pickoff.

Figure 1:
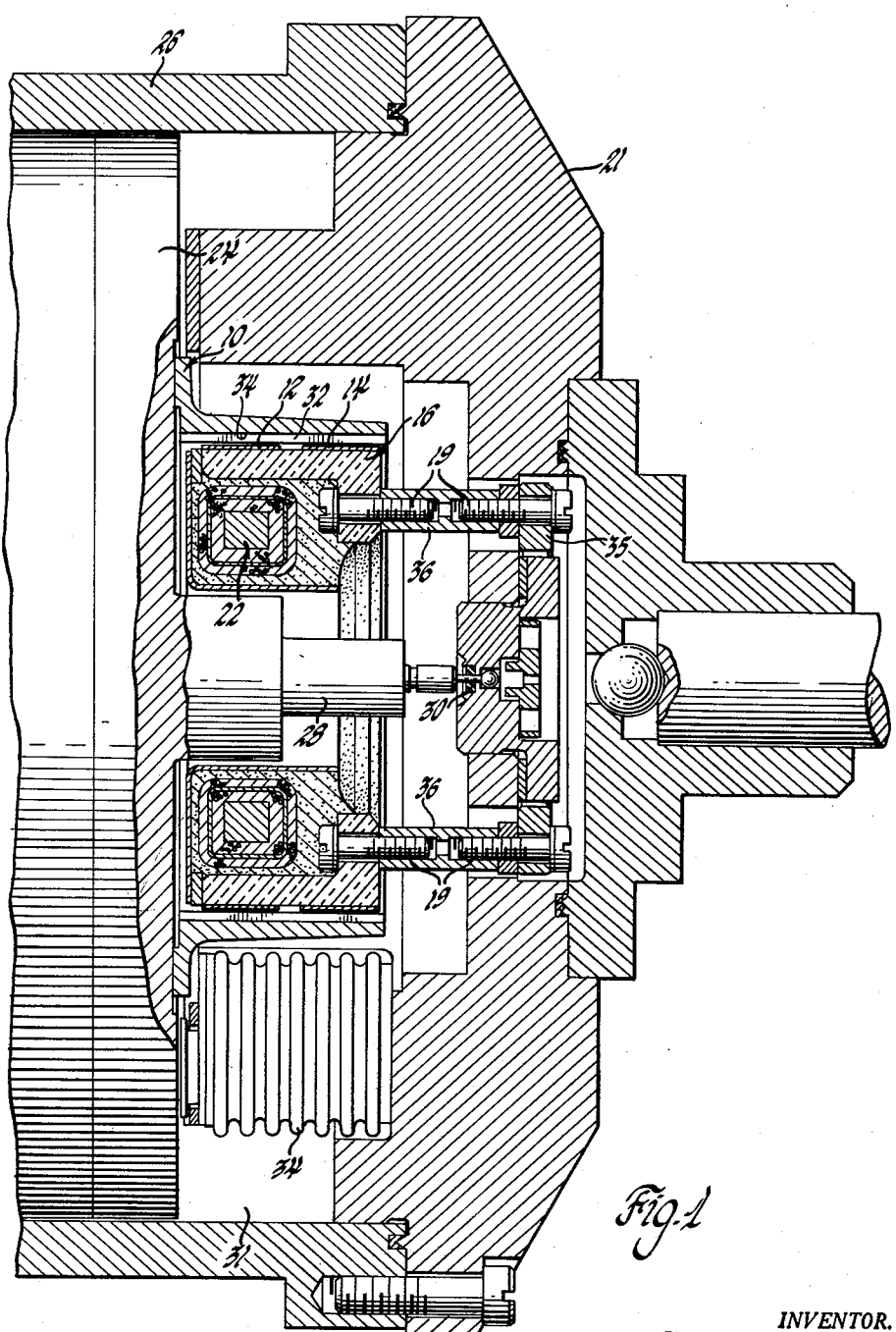
FIGURE 1 shows the invention capacitive pickoff as embodied in a gyroscopic device.

FIGURE 2 is illustrative of one form of the inventive capacitive pickoff wherein the common capacitive element comprises a rotor member 10 and two slotted annular bands 12 and 14 are mounted on a cylindrical stator member 16 to define the pickoff plates. As shown in FIGURE 3, the two capacitors 18 and 20 formed by the bands 12 and 14, acting in cooperation with the rotor member 10, are connected in parallel across an alternating voltage excitation source $E_{in}$ to form parallel current paths. To provide the error signal output $E_{out}$, a transformer 22 has its primary winding connected such that a secondary voltage is produced which is proportional to the difference in magnitude of currents through the above-defined parallel current paths.

Referring now to FIGURE 1, there is shown a gyroscopic device incorporating the inventive capacitive pickoff. A capacitive pickoff is particularly adaptable to gyroscopic devices since it places negligible torque on the moving member. The gyroscopic device comprises an inner member 24 which is rotatably mounted within an outer casing 26 by means of the shaft 28. The inner member 24 is a gyroscope float or gimbal which will be rotated relative to the outer member 26 by the precession of a gyroscope rotor which is contained within the inner member 24. It is required to measure and indicate the angular displacement of the inner member 24 with respect to the outer member 26. To accomplish this measurement, the rotor member 10 of the inventive capacitive pickoff is fixed to the inner member 24 and the stator member 16 is fixed to the outer member 26 by means of the screws 19 and the end plate 21. The inner member 24 is shown supported within the outer member 26 by means of the shaft 28 and a bearing 30. The space 31 between the inner and outer members 24 and 26, respectively, is filled with a viscous damping medium. A bellows-like member 34 is provided to allow for expansion and contraction of the medium. Rotation of the inner member 24 with respect to the outer member 26 is detected by the change in the relative capacitance between the rotor member 10 and the bands 12 and 14, respectively, mounted on the stator member 16. The rotor member 10 is a common capacitor plate in two capacitors which are completed by the elements 12 and 14. The relative capacitance change between these capacitors produces an output signal related to the total capacitance change by means of associated electrical circuitry including a center tapped transformer 22. Although the circuitry does not appear in FIGURE 1, the transformer 22 is shown mounted within the cup-shaped stator member 16. Because of small inaccuracies in the bearing 30, the gimbal or inner member 24 is subject to small axial displacement with respect to the outer member 26. These small axial displacements cause no change in capacitive area between members 10, 12 and 14, respectively, and thus have no effect on the capacitance thereof. This is because the axial length of the rotor member 10 is greater than that of the stator member 16 such that the stator member 16 always remains entirely within the rotor member 10. Radial displacements of the rotor member 10 with respect to the stator member 16 tending to disturb the coaxial relation between these members will also have no effect on the net capacitance, since the net space between the cylindrical capacitor plates remains unchanged.

Referring now to FIGURE 2, the inventive capacitance pickoff is shown in greater detail. The rotor member 10 is formed in the shape of a hollow cylinder. The inner surface of the rotor member 10 has formed thereon a number of congruent capacitive surfaces 32 defined by a plurality of axial slots 34. The rotor 10 is herein shown as being made entirely of conductive material in order to make the capacitors self-shielding to stray capacitance which could adversely affect the pickoff. However, it is contemplated that the surfaces 32 could be plated on or otherwise attached to a nonconductive outer member with conducting means mutually connecting all of the capacitive surfaces 32. The capacitive surfaces 32 are disposed at equal intervals around the circumference of the inner surface of the rotor member 10. The inner surface of the rotor member 10 thus defines a first capacitor plate which is common to two inner mounted capacitor plates as will be made clear in the following.

The stator member 16 is composed of a cylindrical member of ceramic dielectric material which might preferably be alumina or ceramic titanate. This material serves as an insulator between the pickoff plates mounted thereon and also maintains close dimensional accuracy over a wide temperature range. The stator member 16 is adapted to be fixed by means of the threaded posts 36 to an external member 35 which is integral with the end plate 21 of the gyroscopic device shown in FIGURE 1. The outer diameter of the stator member 16 is such that it may be mounted within, but spaced from, the rotor member 10. Disposed upon the outer surface of the stator member 16 by a well-known process of metal deposition are two conductive annular bands 12 and 14. The bands 12 and 14 are axially spaced on the outer surface of the stator member 16 so as to be electrically insulated from each other. Each of the bands has formed therein a number of axial slots 38 and 38' equal in number to the slots 34 in the rotor member 10. The slots 38 and 38' define a plurality of teeth such as 40 or 42 which act as capacitive surfaces to cooperate with the capacitive surfaces 32 in the rotor member 10. For the particular output characteristic shown in FIGURE 4, the width of the axial slots 38 and 38' is somewhat greater than half the width of the teeth 40 and 42 and the bands 12 and 14 are positioned on the stator member 16 such that the top edge of each tooth in band 12 is aligned with the bottom edge of a corresponding tooth in band 14 as viewed in FIGURE 2. The angular displacement of the rotor member 10 in each direction is to be limited to somewhat less than half the width of a slot 38. The bands 12 and 14 thus define second and third capacitor plates, respectively. Due to the staggered relationship of the capacitive surfaces 40 and 42, when the stator member 16 is mounted coaxially within the rotor member 10, the capacitance between the outer member 10 and band 12 will be a maximum while the capacitance between rotor 10 and the band 14 is a minimum and conversely.

FIGURE 3 is a schematic diagram of the associated electrical circuitry which will generate a signal across the output terminals 44 and 46 which is proportional to the angular displacement of the rotor member 10 with respect to the stator member 16. The capacitor designated by reference character 18 is defined by the rotor member 10 and band 12. Likewise, capacitor 20 is defined by the outer member 10 and band 14. The capacitors 18 and 20 are shown as being connected to a common terminal 52 which is grounded. Actually, the grounded terminal 52 is representative of the fact that the rotor member 10 forms a common capacitor plate in both capacitors 18 and 20. The bands 12 and 14 are respectively connected to opposite terminals of the primary coil of a transformer 22. This is represented in FIGURE 3 by showing the outer plates of capacitors 18 and 20 connected across the primary of the transformer 22. Also connected across the transformer primary is a pair of resistors 56 and 58 which are of equal magnitude. The primary coil of the transformer 22 has a center tap 60. The center tap 60 is connected to the junction 62 of resistors 56 and 58. Connected to the junction 62 is an alternating voltage source $E_{in}$ which is the power supply for the capacitive circuit. The secondary coil of the transformer 22 is connected across a pair of output terminals 44 and 46. The output circuit is shown including a current limiting series resistor 64.

Describing now the operation of the circuit of FIGURE 3 in greater detail, it can be seen that two parallel paths for current generated by the source $E_{in}$ exist from the terminal 62 to the grounded terminal 52. The first path includes the parallel combination of the resistor 56 with half of the primary coil of the transformer 22 and the series connected capacitor 18. Similarly, the second path includes the parallel combination of resistor 58 and the other half of the primary coil in series with capacitor 20. Should the current through the first defined path be equal to the current through the second defined path, equal and opposite currents exist in the two halves of the transformer primary. Thus, there will be no output across the terminals 44 and 46. This electrical null is established when the capacitive reactance of the capacitor 18 is equal to the capacitive reactance of capacitor 20. This condition exists at a predetermined angular position of the rotor member 10 with respect to the stator member 16.

As previously described, rotation of the rotor member 10 with respect to the stator 16 will produce an increase in the capacitance between one of the bands 12 or 14 and the rotor member 10 and a decrease in the capacitance between the other band and the rotor member 10. If the frequency of the alternating voltage source $E_{in}$ is constant, the result in the circuit of FIGURE 3 will be an increase in the capacitive reactance of capacitor 18, for example, and a decrease in the capacitive reactance of capacitor 20. This results in a decrease of current through the first defined path and in increase in current through the second defined path. Thus, unequal values of opposing current through the primary coil of transformer 22 will result in a voltage generated across the secondary of the transformer 22 which is proportional to the difference between the opposing currents in the primary. Since an increase in the capacitive reactance of capacitor 18 is concurrent with a decrease in the capacitive reactance of capacitor 20, the circuitry is very sensitive to small angular displacements of the rotor member 10.

The output voltage across the terminals 44 and 46 will be directly proportional to the angular displacement of the rotor member 10 with respect to the stator member 16 over a small range of angular displacements. The output characteristic is shown in FIGURE 4.

The transformer 22 serves two other important functions worthy of note. The first function is the reduction of output impedance for compatibility with transistor circuitry. Secondly, the transformer 22 serves to isolate the output circuit from the input circuit to reduce the effects of stray capacitance. Since the transformer operates at an extremely low flux density, there should be virtually no harmonic distortion. Consequently, the null voltage should be low if the noise level is also low.

It is desirable that the phase angle of the output voltage across terminals 44 and 46 remain constant with rotor rotation. This condition can be assured if the reactance of the primary of transformer 22 is considerably different from the reactance of either of the capacitors 18 or 20. In order to keep the output impedance as low as possible, the reactance of the transformer primary should be less than that of the capacitor.

It is to be understood that the specific embodiments of the invention shown and described herein are illustrative and that various modifications and variations thereof may be made without departing from the spirit and scope of this invention.

We claim:

1. A capacitive pickoff for detecting relative rotation between two members, said pickoff comprising a first cylinder of hollow construction mounted upon one of said members, a second cylinder coaxially disposed within, and spaced from, the inner surface of said first cylinder and mounted upon the other of said members, a first capacitor plate including a first plurality of congruent capacitive elements disposed at equal intervals around the circumference on a selected surface of one of said cylinders, conductive means mutually connecting said capacitive elements, second and third capacitor plates defined by first and second annular bands of conductive material having circumferentially spaced slots to form a plurality of congruent capacitive elements disposed at equal intervals on a selected surface of the other of said cylinders, the elements of the second and third capacitor plates being respectively equal in number to the elements in the first capacitor plate, the first annular band being axially spaced from the second annular band, the slots between adjacent elements in the second capacitor plate being disposed circumferentially intermediate successive slots in the third capacitor plate, said selected surfaces being mutually facing surfaces whereby said relative rotation causes an increase in capacitance between said first and second capacitor plates and a decrease in capacitance between said first and third capacitor plates, and electrical means connected to detect the total capacitive change and to produce an output signal proportional thereto.

2. A capacitive pickoff for detecting relative rotation between two members, said pickoff comprising a first cylinder of hollow construction mounted upon one of said members, the inner surface of said first cylinder having thereon a first plurality of congruent capacitive surfaces, said capacitive surfaces being disposed at equal intervals around the circumference of said inner surface, conductive means mutually connecting said capacitive surfaces thereby defining a first capacitor plate, a second cylinder of ceramic material coaxially disposed within, and spaced from, the inner surface of said first cylinder and mounted upon the other of said members, first and second annular bands of conductive material mounted on the outer surface of said second cylinder and having circumferentially spaced slots therein to form a second and third plurality of congruent capacitive surfaces, said slots being so formed that the surfaces in each of said second and third pluralities are circumferentially disposed at equal intervals around the outer surface of said second cylinder, thereby defining second and third capacitor plates, said second and third pluralities of capacitive surfaces being respectively equal in number to the first plurality, said first and second bands being axially spaced, the slots between adjacent elements in the second capacitor plate being disposed circumferentially intermediate successive slots in the third capacitor plate, whereby said relative rotation causes the capacitance between said first and second capacitor plates to be a maximum while the capacitance between said first and third capacitor plates is a minimum and conversely, a transformer having primary and secondary windings, the primary winding having a center tap, said first and second annular bands being connected across said primary winding, a source of alternating voltage having two terminals, one of said terminals being connected to said first capacitor plate, the other terminal being connected to the junction of said resistors and to said center tap whereby unequal values of capacitance of the capacitors defined by said first capacitor plate and said second and third capacitor plates produce a voltage across said secondary winding, the magnitude of which is proportional to the relative angular displacement between said members.

3. Apparatus as defined by claim 2 wherein said second cylinder is of hollow construction having both inner and outer surfaces, said transformer is in the shape of a toroid and is coaxially mounted within the inner surface of said second cylinder.

4. A variable capacitance device including a rotatably mounted first member of conductive material in the shape of a hollow cylinder, the inner surface thereof defining a first plurality of equally spaced capacitive elements of constant width and length, a second member of nonconductive ceramic material in the shape of a cylinder the length of which is not greater than the length of the first member, said second member being coaxially disposed within said first member such that the first member is free to rotate about the second member, first and second annular bands of conductive material mounted on the outer surface of said second member and having formed therein a plurality of circumferentially spaced slots to define second and third pluralities of capacitive elements, said elements being disposed at equal intervals around the outer surface of said second member, said second and third plurality of elements being respectively equal in number to and capacitively associated with said first plurality of elements, said first annular band being axially spaced from, and circumferentially offset from the second annular band whereby rotation of said first member relative to said second member produces an increase in the capacitance between the first member and said second plurality of elements and a decrease in the capacitance between said first member and said third plurality of elements.

5. Apparatus as defined in claim 4, wherein the elements in said first band are offset from the elements in said second band by a distance equal to the circumferential interval between adjacent elements in one of said first or second bands said interval being greater than half the circumferential dimension of said elements, whereby said increase in capacitance is equal to said decrease in capacitance.

References Cited in the file of this patent

UNITED STATES PATENTS

| | | |
|---|---|---|
| 2,367,017 | Gardiner | Jan. 9, 1945 |
| 2,397,935 | Gardiner et al. | Apr. 9, 1946 |
| 2,606,310 | Baker | Aug. 5, 1952 |
| 2,633,028 | Fillebrown | Mar. 31, 1953 |
| 2,711,590 | Wilcox | June 28, 1955 |
| 2,991,659 | Bowden | July 11, 1961 |